US006868088B2

(12) United States Patent
Gibson et al.

(10) Patent No.: US 6,868,088 B2
(45) Date of Patent: Mar. 15, 2005

(54) AUTOMATIC DETECTOR OF MEDIA INTERFACE PROTOCOL TYPE

(75) Inventors: Patrick Gibson, London (GB); Gareth Edward Allwright, Hertfordshire (GB); Kam Choi, Hertfordshire (GB); Christopher Hay, Middlesex (GB); David John Law, Bedfordshire (GB)

(73) Assignee: 3Com Corporation, Marlborough, MA (US)

( * ) Notice: Subject to any disclaimer, the term of this patent is extended or adjusted under 35 U.S.C. 154(b) by 863 days.

(21) Appl. No.: 09/843,660

(22) Filed: Apr. 26, 2001

(65) Prior Publication Data

US 2002/0110144 A1 Aug. 15, 2002

(30) Foreign Application Priority Data

Feb. 14, 2001 (GB) .............................................. 0103604

(51) Int. Cl.[7] .................................................. H04J 3/16
(52) U.S. Cl. ........................................ 370/419; 370/466
(58) Field of Search ................................ 370/419, 465, 370/466, 467, 252

(56) References Cited

U.S. PATENT DOCUMENTS

| | | | | |
|---|---|---|---|---|
| 5,742,761 A | * | 4/1998 | Olnowich et al. | 370/466 |
| 6,141,352 A | * | 10/2000 | Gandy | 370/463 |
| 6,349,331 B1 | * | 2/2002 | Andra et al. | 709/220 |
| 6,430,201 B1 | * | 8/2002 | Azizoglu et al. | 370/535 |
| 6,624,763 B2 | * | 9/2003 | Kuo et al. | 341/58 |
| 6,636,529 B1 | * | 10/2003 | Goodman et al. | 370/469 |
| 6,650,140 B2 | * | 11/2003 | Lee et al. | 326/39 |
| 6,704,296 B1 | * | 3/2004 | Crayford et al. | 370/279 |
| 6,775,300 B2 | * | 8/2004 | Kuo | 375/363 |
| 6,795,450 B1 | * | 9/2004 | Mills et al. | 370/463 |

* cited by examiner

Primary Examiner—Chau Nguyen
Assistant Examiner—Andy Lee
(74) Attorney, Agent, or Firm—McDonnell Boehnen Hulbert & Berghoff LLP

(57) ABSTRACT

A detector for determining which interface protocol is in use by a serialiser/deserialiser, and comprising detecting channels composed of clocked delays and bit comparators for detecting the presence of idle signals coded according to either ten-bit or five-bit protocols using either one or two clocks.

9 Claims, 6 Drawing Sheets

| Code Group Name | Octet Value | Octet Bits HGF EDCBA | Current RD - abcdei fghj | Current RD + abcdei fghj |
|---|---|---|---|---|
| K28.0 | 1C | 000 11100 | 001111 0100 | 110000 1011 |
| K28.1 | 3C | 001 11100 | 001111 1001 | 110000 0110 |
| K28.2 | 5C | 010 11100 | 001111 0101 | 110000 1010 |
| K28.3 | 7C | 011 11100 | 001111 0011 | 110000 1100 |
| K28.4 | 9C | 100 11100 | 001111 0010 | 110000 1101 |
| K28.5 | BC | 101 11100 | 001111 1010 | 110000 0101 |
| K28.6 | DC | 110 11100 | 001111 0110 | 110000 1001 |
| K28.7 | FC | 111 11100 | 001111 1000 | 110000 0111 |
| K23.7 | F7 | 111 10111 | 111010 1000 | 000101 0111 |
| K27.7 | FB | 111 11011 | 110110 1000 | 001001 0111 |
| K29.7 | FD | 111 11101 | 101110 1000 | 010001 0111 |
| K30.7 | FE | 111 11110 | 011110 1000 | 100001 0111 |

FIG. 2

AUTOMATIC DETECTOR OF MEDIA INTERFACE PROTOCOL TYPE

This invention relates to packet-based communication systems and particularly to network switches, routers and the like which include a SERDES (serialiser/deserialiser) between a media access control device (MAC) and the transmission medium by means of which signals including the packets are connected to and from the media access control device The invention particularly relates to systems conforming to IEEE Standard 802 3.

BACKGROUND OF THE INVENTION

Network switches, including for present purposes devices variously known as bridges. routers and brouters, may be connected to a variety of transmission media such as copper cable or optical fiber, using either a physical layer entity normally denoted PHY or a SERDES. These devices are usually external to the switching ASIC performing the basic functions of the network switch They employ a variety of interface protocols dependent upon the type of the cable and the port speed that is to say the design data rate at which data may be sent from or received by the port associated with the particular MAC. The most common type of interface protocols used at present are the IEEE TBI (10-bit interface) protocol used to connect to fiber cables rated for gigabit data rates and IEEE GMII 10-bit protocol which is used to connect the MAC to copper cable for gigabit Ethernet and the IEEE MII 5-bit protocol to connect the MAC to copper cable for 10/100 Ethernet, that is to say Ethernet type data at either 10 or 100 megabits per second Recently other interfaces have been developed, such as the reduced gigabit media independent interface (RMGII) which supports a reduced 5-bit interface for PHYs supporting 1000/100/10 megabit per second Ethernet speeds on copper cable. At the same time a 5-bit reduced SERDES interface protocol has been agreed termed RTBI SERDES devices for connection to fiber optic cable are different from PHYs used for connection to copper cable in that (assuming an 8-bit/10-bit encoding scheme) all the ten input and output pins of the SERDES carry data rather than the provision of some data bits and some control bits as in the GMII interface. The receiver side of the local snitches media access control device must be synchronised to the 10 bits of data from the transmitter block of the SERDES associated fifth the switch at the far end of the link Likewise the local switch's media access control transmitter block transmits 8-bit/10-bit encoded data to which the receiver of the SERDES at the far end of the link must be synchronised. As will be explained in more detail later there are a multiplicity of code groups. One character or symbol of importance to the present invention is an idle (I2) symbol which is made up of two code groups Several variations of the symbol exist. The receive sides of both the media access control device and the SERDES must decode and lock on to the idle symbols for communication to occur over a communication link As swell as the recently defined RGMII and RTBI protocols various manufacturers have produced variants of SERDES devices to support both the TBI and RTBI protocols Various devices include interfaces relying on 10 bits or 5 bits using a single clock or two clocks on the receiver interface It is generally desirable to be able to support a variety of interface protocols and to enable products to be modular in form enabling any configuration of the interfaces to be plugged into the ports of a network switch It is accordingly desirable to provide a means of identifying the SERDES device on the plug-in module in order that the software drivers for the media access control device can be correctly configured It is known practice to identify a plug-in card be using either a memory-mapped register or a plug-in module which is readable by an on-board processor (CPU) by means of a series of encoded pins pulled high or low according to the deice attached. However, both these methods involve using pins on a module connector and impose a space or cost penalty A fully modular switch wherein all ports are of the plug-in type allotting support for testing a variety of different media types would add a substantial cost overhead to products

SUMMARY OF THE INVENTION

The present invention is directed to the automatic detection of an interface connected to a port without the need for CPU interrogation by way of an interface or via pull-up/pulldown pins. In particular this will save on the pin count required at a plug-in port connector.

In particular the present in mention concerns a detector composed of clocked delays and gates and controlled by complementary clock signals at the appropriate rate to determine the interface protocol to which a two-group idle symbol conforms A practical form of the invention employs the clocked delays to present for each interface protocol sufficient bits from the too groups simultaneously to comparators whereby to determine the existence of the code groups in accordance with the various protocols The detector is organised to provide at an time at most a single valid output identifying the interface protocol actually employed. Preferably the detector distinguishes between 10-bit and 5-bit protocols which may employ either a single clock or two complementary clocks Further features of the invention will become apparent from the following detailed description with reference to the accompanying drawings which illustrate both the background to the invention and a preferred implementation of the invention by way of example

BRIEF DESCRIPTION OF THE DRAWINGS

FIG. 2 is a table illustrating various special code groups in 8-bit/10-bit encoding FIGS. 3 to 6 each illustrate a particular type of clock signal characteristic of different types of serialiser/deserialiser

DETAILED DESCRIPTION

Figure 1:
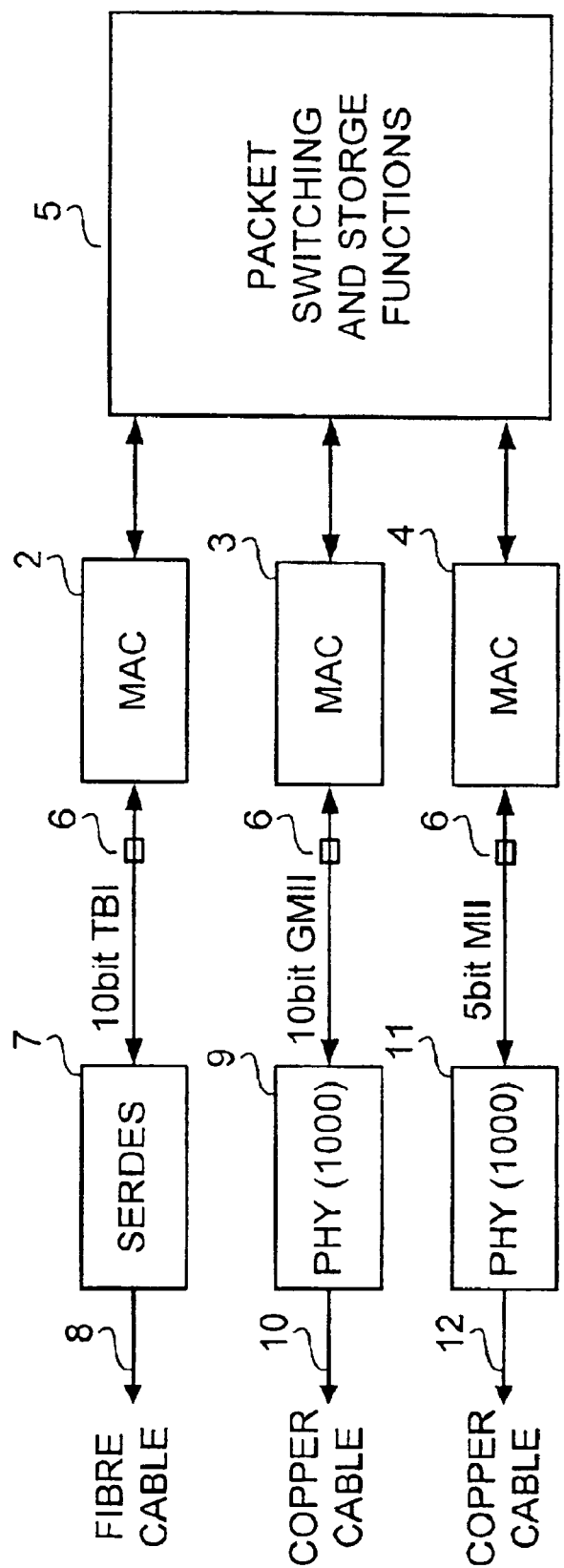
FIG. 1 is an explanatory diagram illustrating the connection of media access control devices to a variety of transmission media

FIG. 1 of the drawings illustrates for the purpose of explanation possible different connections of the media access control devices within a switching ASIC of a network switch to such devices as a SERDES or physical layer devices (PHYs). The example given is of a network switch which is implemented (as is known practice) mainly by a switching ASIC 1 that includes a multiplicity of media access control devices (MACs) 2, 3 and 4, there being normally one of these devices for each port of the switch The (conventional) packet switching and storage functions the details of which are not relevant to the present invention are denoted by the schematic block 5 It is presumed in this example that the MACs may be connected to a SERDES or PHY by an appropriate connector 6 and that each of these connectors 6 man be connected to, for example a SERDES (serialiser/deserialiser) which has a port for connection to a fiber optic cable 8 a PHY 9 for connection to copper cable 10 or a different PHY 11 for connection to copper cable 12. Devices such as 7. 9 and 11 are typically constituted by a plug-in card or module Different PHYs or SERDES are employed for connection to different transmission media operating at different data rates FIG. 1 gives the example of a SERDES 7 which operates according to a TBI (10-bit interface) for connection to gigabit Ethernet fiber optic cable a PHY 9 which operates according to the IEEE GMII 10-bit protocol to connect to copper cable for operation at gigabit data rates and a PHY which operates according to the IEEE MII 5-bit protocol for connection to copper cable for 10/100 (megabits per second) Various other protocols for the media independent interface between the MAC and the intermediate physical layer device exist but the ones mentioned are the most common More recently another implementation for a PHY has obtained acceptance This interface is called RGMII (reduced gigabit media independent interface) and supports a reduced 5-bit media independent interface for PHYs that support data rates of 1000/100/10 megabits per second for the transmission of Ethernet packets on copper cable. Furthermore a 5-bit reduced SERDES interface has also obtained acceptance: it is termed RTBI (reduced 10-bit interface)

As previously noted. SERDES for fiber differ from PHYs used for copper cable in that all the ten input/output pins are data pins rather than a mixture of data pins and control pins as in a GMII interface for a PHY The receive side of the MAC must synchronise to the 10 bits of data from the transmitter block of the SERDES by decoding the data which is encoded using an 8-bit/10-bit coding scheme in accordance with, for example. IEEE Standard 802 3. Likewise the switch's MAC transmit block must transmit 8-bit/10-bit encoded data to which the receive side of the SERDES must be synchronised. Synchronisation with the encoded or decoded 10-bit/8-bit data is achieved using specially coded characters or symbols Examples of these are shown in FIG. 2 which is a table of code group names the respective octet value the octet bits and those bits as represented by current running disparity value both negative and positive after 8-bit/10-bit coding The designation of the octet bits (HGFEDCBA) and the running disparity bits (abcdeifghj) conform to IEEE Standard 802 3 Clause 36 The valid special code groups as shown in FIG. 2 include a start of packet code group K277 an end of packet code group K297 and other code groups which may be used either alone or in combination with other valid data code groups Of relevance to the present invention is code group K-285. Which represents a comma symbol and is employed as the first code group of an idle (I2) symbol. It is followed in practice for this purpose by a valid code group known as D16.2, which has an octet value 50, octet bits 010 10000 and running disparity (RD-) bits 01 1011 0101 (Table 36-1b in the aforementioned Standard) Several variants of the K symbol (K28 5) exist but the full set is decodable using the looser 7 bits This means that it is sufficient to detect (0011111xx) where x indicates 'don't care'

As well as the newly defined RGMII and RTBI protocols variants of SERDES protocols have been devised to support TBI and RTBI In general the options include interfaces having a 10-bit code using a single clock or a 5-bit code using two clocks (so that the 10 bits of the K28 5 character are clocked in successive clock cycles)

The preferred embodiment of the present invention is specifically intended to detect automatically the interface protocol in use provided that it is either a 10-bit code or a 5-bit code and employs either one clock or two complementary clocks In the 10-bit codes all ten bits of each group are available at the same time In the 5-bit codes the ten bits are available in successive groups of 5 bits The idle and other symbols are encoded into the receive data streams to the MAC for all the device options the actual coding being dependent on the number of clocks and the data bus width A single receive clock scheme uses both the rising and falling edges of a single clock to latch in the 5 or 10 bits of data The two clock schemes (one clock being inverted with respect to the other) employ two complemental clocks to clock in the data on their respective rising edges The different schemes are shown in FIGS. 3 to 6.

Figure 3:
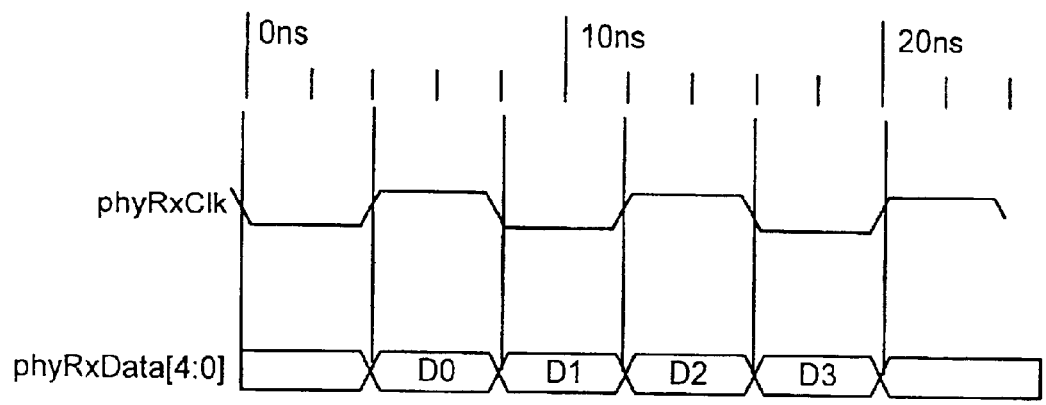
Figure 4:
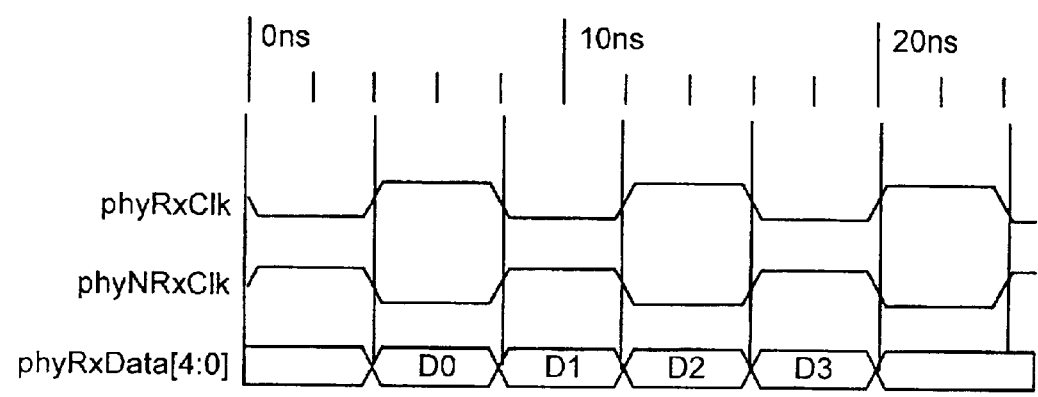
Figure 5:
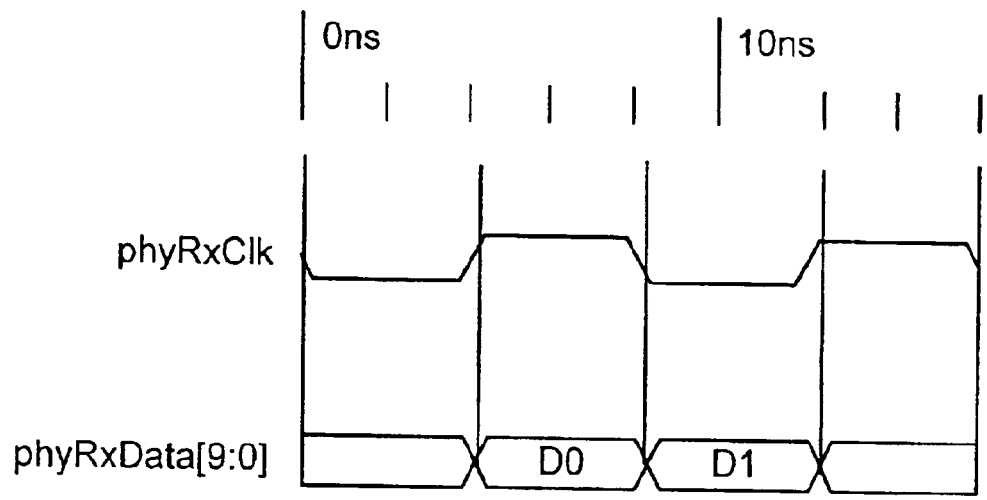
Figure 6:
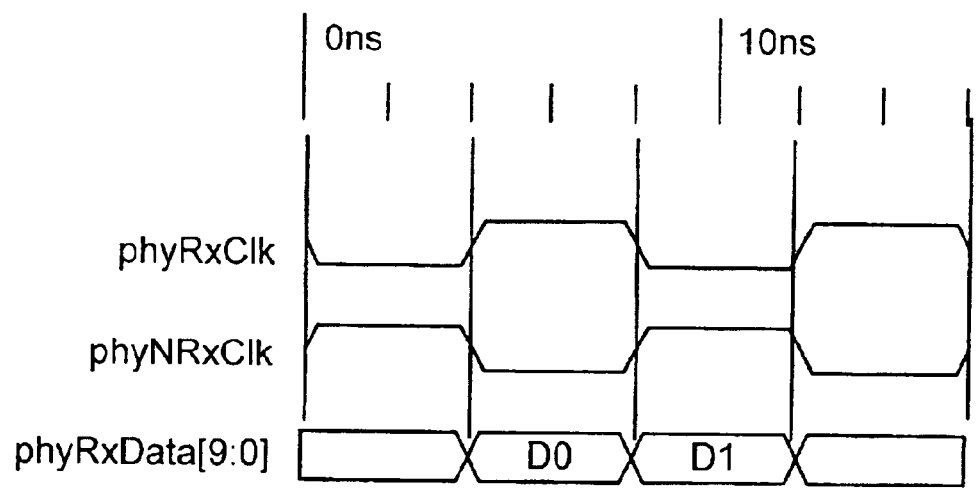

FIG. 3 Illustrates a 'DDR 5-bit -1 clock' scheme which operates on receive data five bits wide The first five bits (segment D0) are clocked in on the rising edge of the clock. denoted 'phyRxClk' whereas the next five bits are clocked in on the subsequent falling edge of the clock A 5-bit scheme employing to receive clocks denoted 'phyRxClk' and 'phyNRxClk' is shown in FIG. 4 Five bits of data are clocked in employing the rising edge of the phyRxClk clock and the subsequent five bits segment D1, are clocked by the phyNRxClk clock FIG. 5 Illustrates a 10-bit scheme using a single receive clock 10-bit wide data of which the successive segments are shown as D0 and D1, are clocked using both the rising edge and falling edges of the receive clock FIG. 6 illustrates a fourth scheme employing 10-bit wide data wherein successive segments of 10 bits are clocked using the rising edge of two complementary clocks 'phyRxClk' and 'phyNRxClk' respectively The present invention is a detector which distinguishes between different interface protocols by detecting the presence of the bits characteristic of the comma and following code group at times determined in accordance with the various protocols In particular internal clocks (both direct and inverse) are employed in conjunction switch clocked delay elements (such as D-flip-flops) comparators (for detecting relevant bit matches) and coincidence detectors to detect the presence of the comma symbol in accordance with each of the protocols shown in FIGS. 3 to 6

Figure 7:
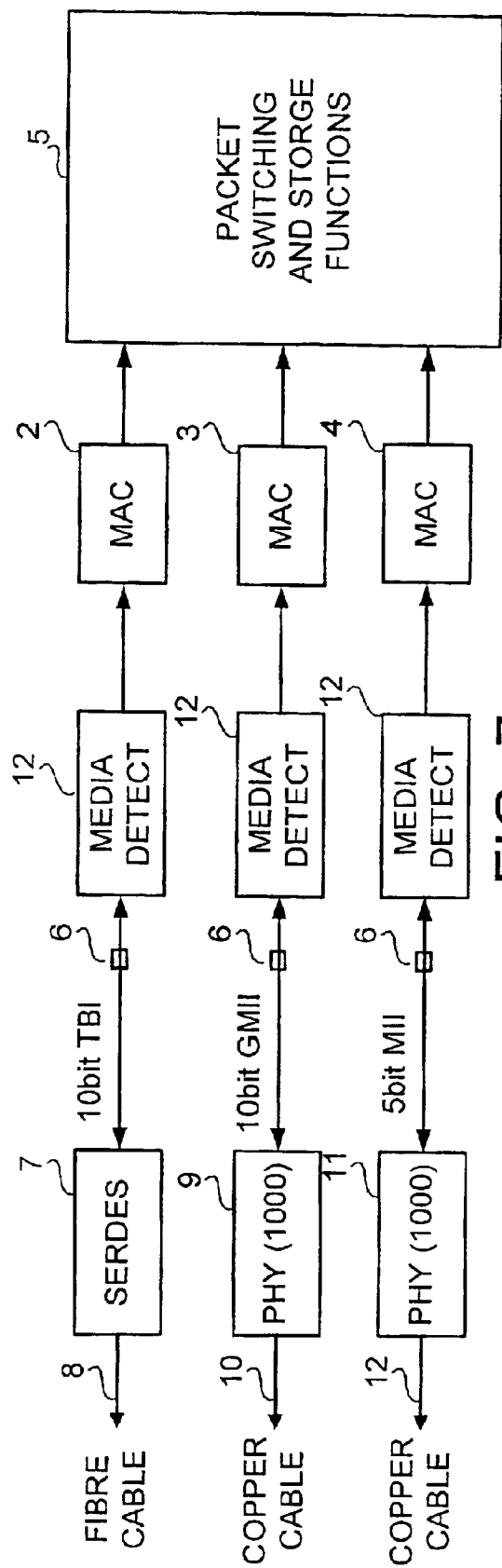
FIG. 7 is a schematic diagram illustrating the disposition of a detector according to the invention in relation to a switch as shown in FIG. 1
Figure 8:
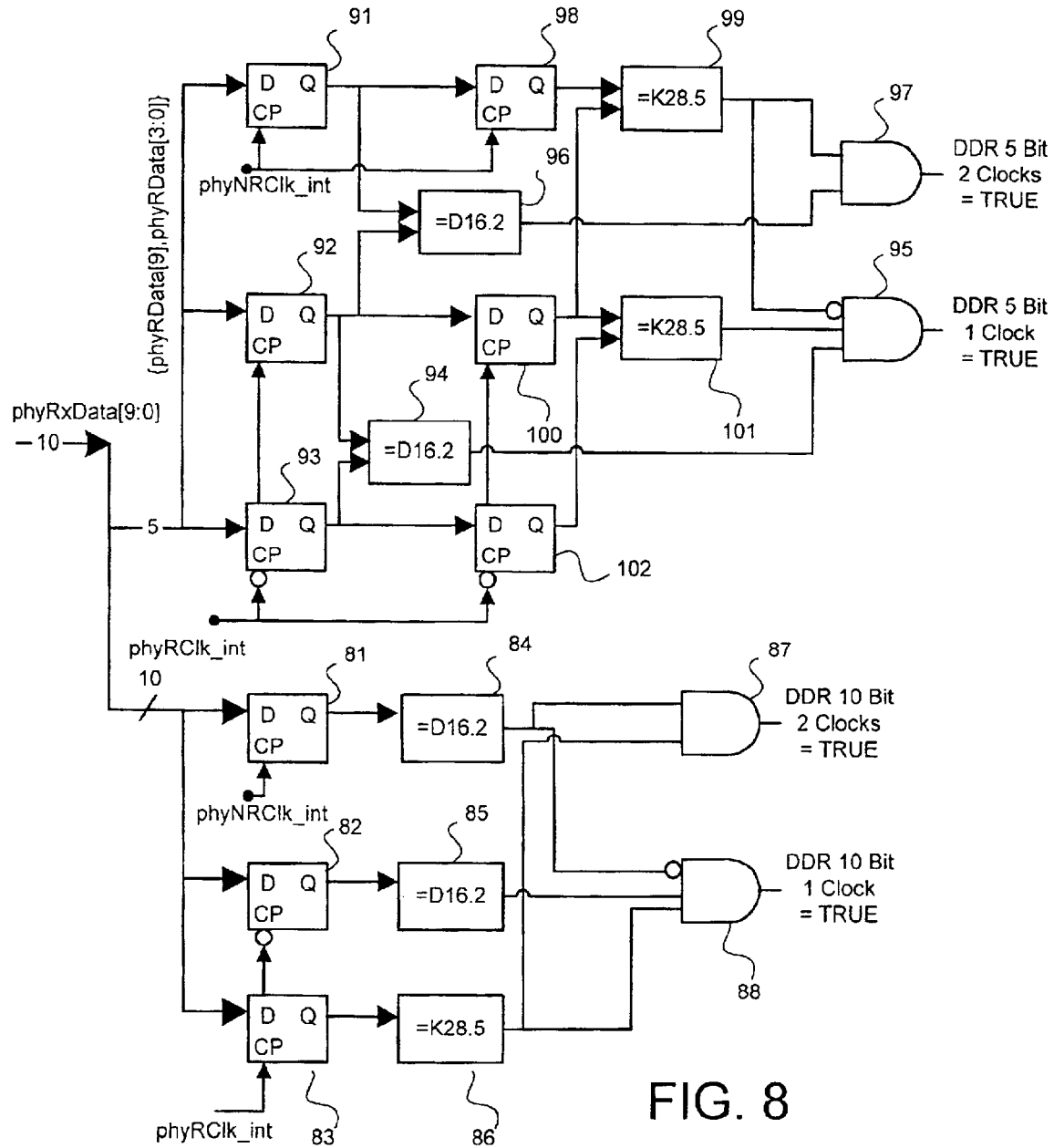
FIG. 8 is a detailed schematic diagram of a detector according to the invention

FIG. 7 illustrates schematically the disposition of the present invention in a known scheme such as FIG. 1 Between the relevant connector 6 and MAC 2 is disposed a media detect circuit 12 which will be described by way of example with reference to FIG. 8 The purpose of the media detect 12 is only to determine which interface protocol is employed by the SERDES FIG. 8 illustrates in detail one embodiment of the invention For the sake of simplicity it shows on one 'layer' Some of FIG. 8 is 10 bits deep whereas some is 5 bits deep but in each case one the gates for one bit are shown The detector is organised as a plurality of clocked detecting channels each of which is controlled by the respective clock system including bit comparators (which may be common to more than one channel) in order to determine the presence of idle signals which conform to a respective interface protocol characterised by a particular clock scheme and code bit grouping (i e 10-bit or 5-bit)

The data input to the detector shorn in FIG. 8 are the 10-bit lines from the SERDES This data input is denoted 'phyRxData [9 0]'

The clock inputs to the detector are a direct and inverse clock at the data transfer rate of the incoming data These complementary clocks are denoted 'phyRClk_int' and 'phyNRClk_int' respectively These clocks are internally generated and are presumed to correspond to the clocks which may be used by the SERDES The detection of the 10-bit protocols is the simpler and is performed by, the components shown in the lower part of FIG. 8

Each of the ten data lines is corrected to a respective set of three D-flip-flops 81. 82 and 83 Flip-flop 81 is clocked by the rising edge of 'phyNRClk_int' Flip-flops 82 and 83 are clocked by the direct and inverse versions of the clock 'phyRClk_int'

The (ten) flip-flops 81 are each coupled to a respective stage 84 of a bit for bit comparator for detecting the presence of the 10 bits D16 2 code (the second half of the I2 symbol) The to flip-flops 82 are likewise coupled to respective stages 85 of a bit for bit comparator for detecting the 10 bits D16 2 code The flip-flops 83 are connected to the stages of a bit for bit comparator 86 which detects the 10-bit K group (i e the first half of the I2 symbol) Each comparator provides an active output if all the respective input bits match the bits of respective predetermined code group It should be possible to determine on the lower 7 bits of the K group The outputs of the comparators 84 and 86 are connected to inputs of a coincidence detector (represented by AND gate 87) The outputs of all three comparators 84. 85 and 86 are connected to inputs of coincidence detector (AND gate) 88 the input from comparator 84 is inverted (active low) so that coincidence detector requires TRUE outputs from comparators 85 and 86 and a FALSE output from comparator 84 If the SERDES employs the DDR 10-bit 1 clock protocol all the relevant bits will be simultaneously clocked out of flip-flops 82 and 83 and coincidence detector 88 detects the simultaneous presence of the correct bits input to comparators 85 and 86 If the SERDES employs the DDR 10-bit 2 clock protocol (FIG. 6) the relevant bits of the K symbol are clocked out of flip-flop 83 by the phyRClk_int clock and the relevant bits of the D16.2 code are clocked out of the flip-flop 81 by the phyNRClk_int clock The existence of this protocol is detected by coincidence detector 87

The upper part of FIG. 8 shows the detection of the two 5-bit protocols in a manner similar to but more complex than the detection of the 10-bit protocols The simultaneous presence of correct bits from the two code groups needs an additional stage of clocked delay The inputs to the upper part are the five lines [9] and [3 0] of the phyRxData lines It is presumed that the 5-bit signals are carried on these selected lines. The five inputs are connected to a respective set of D-flip-flops 91, 92 and 93 of which flip-flops 92 and 93 are clocked by the direct and inverse forms of the positive internal clock phyRClk_int and flip-flop 91 is clocked by the 'negative' or complementary internal clock phyNRClk_int. Flip-flop 92 and flip-flop 93 can provide alternative inputs to comparator 94 of which the output is coupled to an active high input of coincidence gate 95 Flip-flops 91 and 92 can provide alternative inputs to comparator 96 of which the output is connected to an active high input of coincidence gate 97 Flip-flop 91 has an output coupled to the D-input of D type flip-flop flop 98, clocked by the same clock the output of flip-flop 98 being coupled to inputs of comparator 99 of which an output is coupled to an active high input of coincidence gate 97 and also to an active low input of coincidence gate 95. Flip-flop 92 has an output coupled to the D-input of a D-type flip-flop 100, clocked be the positive internal clock The output of this flip-flop is coupled to the input of comparator 101. The latter detector is coupled to an active high input of coincidence detector 95

Finally D-type flip-flop 93 has an output coupled to the D-input of a D-type flip-flop 102, clocked by the inverse a version of the 'positive' internal clock The output of this flip-flop is coupled to the input of comparator 101

In a manner analogous to that already described, where the outputs of comparators 94 and 101 are TRUE and the output comparator 99 is FALSE the protocol in use is the 5-bit-1 clock protocol as signaled by the output of coincidence detector 95. When the outputs of comparator 96 and comparator 99 are both true the protocol in use is the 5-bit-2 clock protocol as signaled by the output of coincidence detector 97

What is claimed is:

1. A detector responsive to 8-bit/10-bit encoded data signals which conform to one of a variety of interface protocols comprising:

a multiplicity of clocked delays providing a plurality of detecting channels each including at least one of said clocked delays means for clocking respective clock delays of said clocked delays in accordance with respective forms of clock signals at a common rate:

means coupled to selected ones of said clocked delays for detecting the presence of a two-group idle signal conforming to each of said interface protocols and for indicating the said one of the interface protocols to which said data signals actually conform.

2. A detector according to claim 1 wherein said clocked delays and said means for detecting enable the identification of each of four interface protocols characterised respectively by (I) one clock signal which clocks five bits at a time (II) two clock signals each of which clocks five bits at a time (III) one clock signal which clocks ten bits at a time and (IV) two clock signals each of which clocks ten bits at a time.

3. A detector according to claim 1 wherein said clocked delays comprise D-type flip-flops.

4. A detector according to claim 1 wherein said forms of clock signals are complemental forms of a clock signal.

5. A detector according to claim 1 wherein said means for indicating comprise coincidence detectors.

6. A detector according to claim 1 wherein said two-group idle signal comprises a comma code group and a valid code group according to IEEE Standard 802 3.

7. A detector responsive to 8-bit/10-bit encoded data signals which conform to one of a variety of interface protocols comprising:

a multiplicity of D-type flip-flops providing a multiplicity of detecting channels each including at least one of said D-type flip-flop means for clocking respective ones of said D-type flip-flops in accordance with respective forms of clock signals at a common rate:

comparators coupled to selected ones of said D-type flip-flops for enabling the detection of the presence of a two-group idle signal conforming to each of said interface protocols and coincidence detectors coupled to the comparators to indicate the said one interface protocol to which said data signals actually conform.

8. A detector according to claim 7 wherein said two-group idle signal consists of a comma code group and a valid code group according to IEEE Standard 802 3.

9. A detector according to claim 8 wherein said comma code group is a K28.5 code group and said valid code group is a D16 2 code group.

* * * * *